United States Patent [19]
Karubian et al.

[11] Patent Number: 5,083,971
[45] Date of Patent: Jan. 28, 1992

[54] BEEF CARCASS HEAD-SEPARATING TOOL

[75] Inventors: Ralph K. Karubian, Los Angeles, Calif.; John Leamen, Omaha, Nebr.

[73] Assignee: Kentmaster MFG. Co., Inc., Los Angeles, Calif.

[21] Appl. No.: 642,060

[22] Filed: Jan. 16, 1991

[51] Int. Cl.[5] ............................................. B26B 13/00
[52] U.S. Cl. ..................................... 452/64; 452/167; 30/245
[58] Field of Search ......................... 452/64, 166, 167; 30/227, 245, 246, 225, 279 R, 194

[56] References Cited

U.S. PATENT DOCUMENTS

| | | | |
|---|---|---|---|
| 3,039,189 | 6/1962 | McBerty | 30/245 |
| 3,165,780 | 1/1965 | Kellersman et al. | 452/166 |
| 3,816,874 | 6/1974 | Jahnke | 452/167 |
| 3,893,237 | 7/1975 | Jahnke | 30/245 |
| 4,653,147 | 3/1987 | Van Der Eerden | 452/167 |
| 4,949,461 | 8/1990 | Van Der Merwe et al. | 30/245 |

Primary Examiner—Willis Little
Attorney, Agent, or Firm—Allan M. Shapiro

[57] ABSTRACT

The head-separating tool is a pair of pivoted blades, each having two sections. The section closest to the pivot comprises a wedge on each blade positioned so that the wedges come together in nearly point-to-point contact to engage in the beef neck's Atlas joint to separate the joint. The portions of the blade farther from the pivot are shears which overlap when closing to cut the soft neck tissue below the Atlas bone. The blades are power-actuated to disjoint at the Atlas joint with substantially no bone chipping.

20 Claims, 2 Drawing Sheets

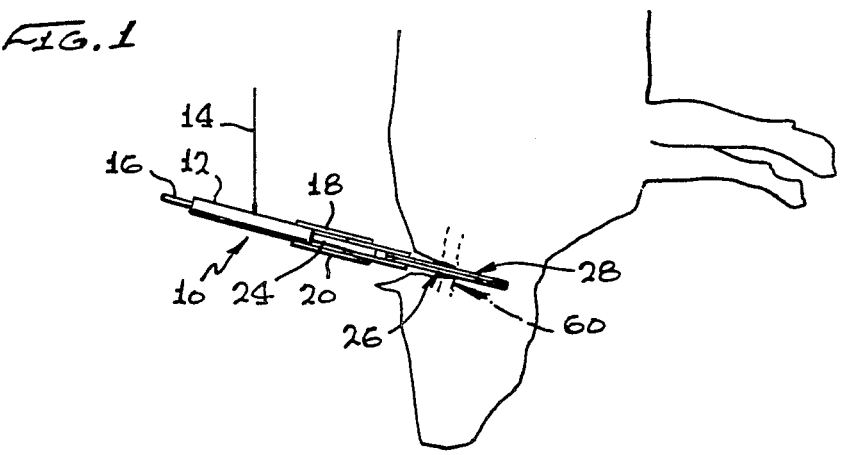
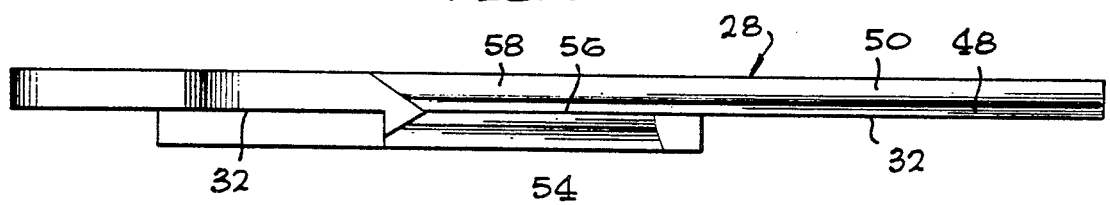
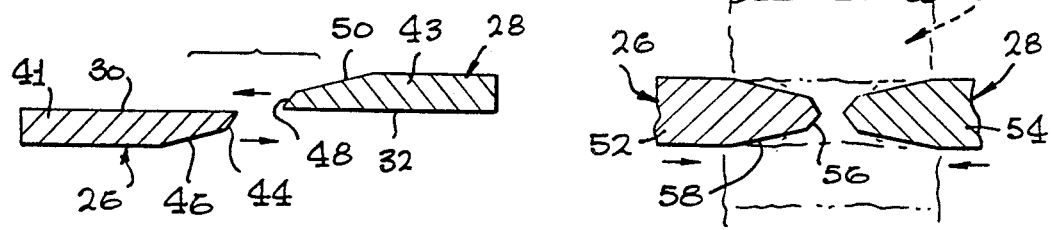
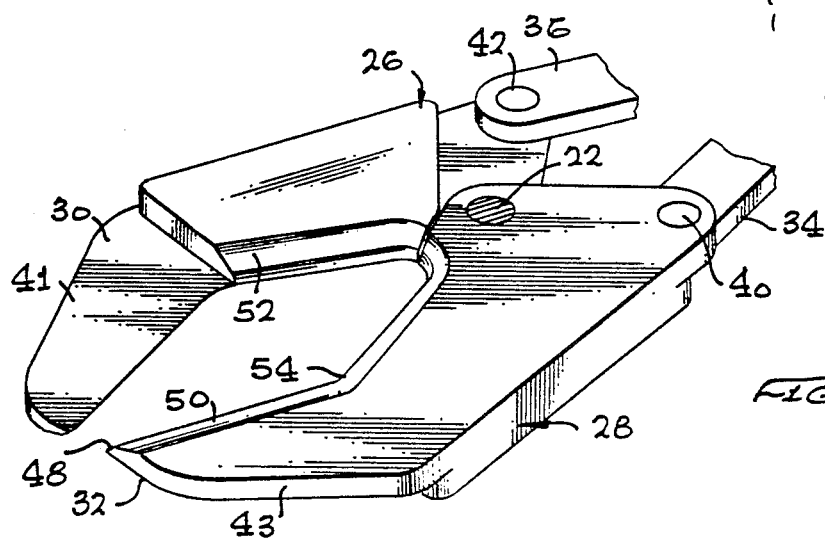

BEEF CARCASS HEAD-SEPARATING TOOL

FIELD OF THE INVENTION

This invention is directed to a power tool to be employed for separating the head from a beef carcass on a slaughterhouse production line.

BACKGROUND OF THE INVENTION

In a beef slaughterhouse production line, the carcass is suspended by its hind legs, is drained and gutted. The hide is stripped off, and the hanging carcass has a beef head still attached to it. In prior practice, the muscles surrounding the neck in the ear and jaw area must be cut by a manually operated knife. In addition, a knife cut is made directly at the base of the head to expose the Atlas joint. The Atlas joint is the joint between the occipital skull bone and the Atlas vertebrae, which is the first cervical vertebrae. The worker must turn and rotate his wrist back and forth through various angles while working the knife into the Atlas joint and cutting tendons so that the weight of the head will force the joint apart and, thus, facilitate separation of the head from the carcass. This repetitive movement of the worker's wrist, hand and elbow places excessive strain on the operator's muscles and tendons. When repeated often, this results in carpal tunnel syndrome. This is an ailment which is extremely painful and debilitating.

When a scissors-type power tool with conventional shear blades is used to cut through the Atlas joint and nearby tissue, the cut can be made quickly with little effort to eliminate the difficult hand-work portion of separating the head. However, these shear blades have sharp edges, and often the blades do not find the way between the joint. This causes bone chips which enter the meat to result in a less desirable product. The bone chips require additional labor to find and remove those bone chips. The prior manual methods resulted in disability, and the prior power tool methods resulted in bone chips in the meat. As a result, there is need for an improvement.

SUMMARY OF THE INVENTION

In order to aid in the understanding of this invention, it can be stated in essentially summary form that it is directed to a beef carcass head-separating tool which has a pair of pivoted blades. The portion of the blades close to the pivot are wedges which directly approach each other, and the portions of the blades which are farther away from the pivot are in the form of shears which pass each other to cut the soft tissue. As a result, the wedges separate the joint at the same time the adjacent soft tissue is sheared.

It is, thus, an object and advantage of this invention to provide a beef carcass head-separating tool which is a power tool which quickly and easily separates the head at the Atlas joint and also cuts the adjacent tissue to separate the head with minimal effort and minimal remaining bone chips.

It is a further object and advantage of this invention to provide a beef carcass head-separating tool which has a wedge for separating the beef head at the Atlas joint and which has adjacent shears for cutting the soft tissue adjacent thereto.

It is a further object of this invention to provide a beef carcass head-separating tool which separates the beef head in a manner such as to minimize bone chips in the meat so as to meet USDA requirements.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 1 is a side view of the beef carcass head-separating tool of this invention shown in use.

FIG. 3 is a sectional view, as seen generally along line 3—3 of FIG. 2.

FIG. 4 is a sectional view, as seen generally along line 4—4 of FIG. 2.

FIG. 5 is a sectional view, as seen generally along line 5—5 of FIG. 2, showing the Atlas joint in dashed lines.

FIG. 6 is a perspective view of the pivoted blades shown in the partly closed position, with parts broken away and the pivot pin taken in section.

DESCRIPTION OF THE PREFERRED EMBODIMENT

Figure 2:
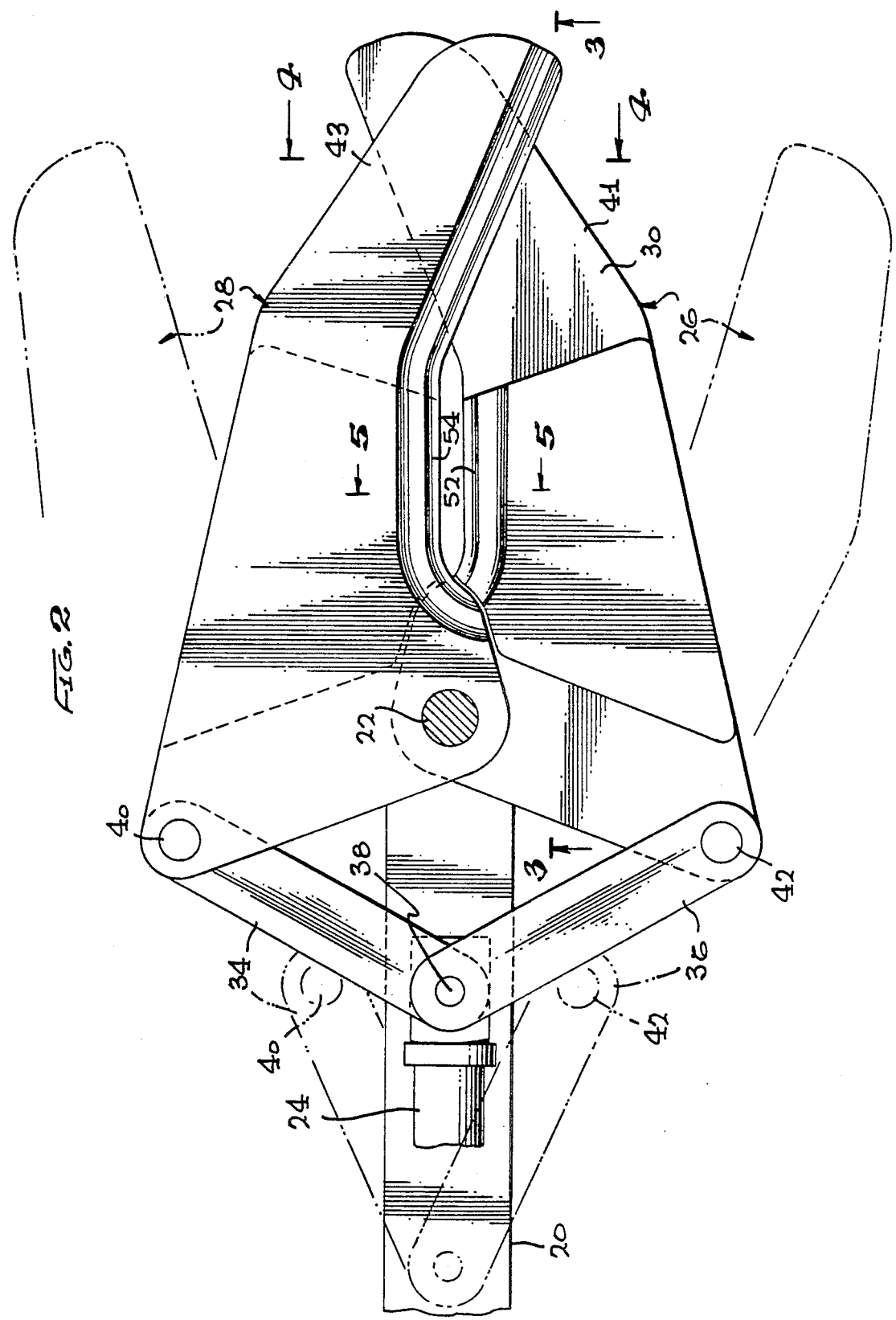
FIG. 2 is a plan view of the blades of the separating tool with the power cylinder and support removed, showing the blades in closed position in full line and in open position in dashed line.

The beef carcass head-separating tool of this invention is generally indicated at 10 in FIG. 1. The tool comprises an actuator 12, a support 14, and one or more positioning and control handles 16. The actuator is preferably a fluid actuator, such as a hydraulic cylinder, in order to keep electricity away from the work place. The positioning and control handles are mounted on the actuator so that the operator can position the tool and cause its actuation. Support 14 is a counter-balancing structure to carry the weight of the tool while the operator positions it. While the actuator 12 is a hydraulic cylinder, other types of actuators such as pneumatic or electrically-powered actuators are feasible. Mounted on and extending from the actuator are upper and lower arms 18 and 20. These arms extend forward and carry pivot pin 22 therethrough, see FIGS. 2 and 6. Piston rod 24 is driven by a hydraulic piston in actuator 12 and causes the tool to be operated.

FIGS. 2–6 best show the two blades 16 and 28. Blade 26 has bearing face 30 which faces upwardly, while upper blade 28 has bearing face 32, see FIGS. 3, 4 and 6 which faces downwardly. These faces lie against each other and are preferably lubricated because they slide. Pivot pin 22 engages in pivot pin openings in the two blades at these bearing faces 30 and 32. The blades rotate with respect to each other around the pivot pin, and these bearing surfaces define a shear plane. The upper and lower arms 18 and 20 respectively engage upon pivot pin 22 above and below blades 26 and 28 to fix the position of the pivot pin with respect to the tool 10. Actuating links 34 and 36 are pivoted on the forward end of piston rod 24 on pivot pin 38 and are respectively pivoted on the outer rear corner of the blades 28 and 26 on pins 40 and 42. By motion of the actuator piston rod, the blades move from the open position shown in dashed lines in FIG. 2 when the actuator piston rod is rearward to the closed position shown in full lines in FIG. 2 when the actuator piston rod 24 is in the forward position.

The blades have two operative sections or portions. The forward portions of the blades are shear portions 41 and 43, which have surfaces which lie on the shear plane so that they can pass over each other. In the closed position, the shear portions 41 and 43 are overlapped, as shown in FIG. 2. The shearing action is shown in FIG. 4. The edge of the shear portion 41 has a cutting face 44, which is preferably at about 45 degrees to the shear plane, and a clearance face 46, which is preferably at about 15 degrees to the shear plane. The shear portions of the blades are directed toward each other so that they overlap when in the closed position, as seen in FIG. 2. The angle of the shear portions with respect to the center line is about 26 degrees when closed. The shear portion 43 of upper blade 28 has the same cutting face 48 and clearance face 50. The overlapping angle of 26 degrees from the center line in the closed position, as seen in FIG. 2, is such that, when the jaws are full open in dashed lines, the shear portions diverge from each other for easy positioning about the carcass neck. Furthermore, this angle is such that, with an average beef carcass being cut, these blades are substantially parallel to each other when cutting engagement of the blades into the beef carcass occurs.

The separating portions of the blades 26 and 28 are generally indicated at 52 and 54, respectively. The separating portions extend from forward of the pivot to the back of the shear portion. The separating portions do not touch in the closed position, but are closely spaced (about ⅛ inch apart) in the closed position shown in FIG. 2. The stop in this position is caused by the limit of motion of the actuator. In the closed position, the separating portions 52 and 54 are parallel to each other. As seen in FIGS. 3 and 5, the separating portion 54 has a first face section wedge 56 with substantially 90 degrees total included angle. It is followed by a second fare section wedge 58 with about a 30 degree total included angle. These angles are the same as those in the shear portions. The length from the pivot pin 22 to the far end of the blades, to the right end shown in FIG. 2, is sufficient to engage at the Atlas joint 60 (see FIGS. 1 and 5) of a hanging steer with the shear blades cutting through to the trachea and the separating wedges reaching the Atlas joint 60.

In use, the beef carcass is hung, bled, gutted and skinned. A knife cut is made through the soft tissue in one straight cut on each side of the neck to expose the Atlas joint. Only exposure of the joint is necessary. There is no need to cut ligaments or pry about the bone joint. There is no difficult cutting. The hanging carcass is in tension so that a cut at the proper point on each side of the neck of the beef carcass easily exposes the Atlas joint. Since this type of manual knife operation does not require twisting of the knife blade, carpal tunnel syndrome injuries are avoided. Next, the tool 10 is brought into position with respect to the hanging beef carcass. With the blades in the open position, the blades are engaged at the Atlas joint with the pivot pin substantially parallel to the Atlas bone. The opened blades are thrust forward into position in line with the exposed Atlas joint, and the tool is actuated. The forward moving piston rod causes closure of the blades. The shearing portion cuts through the trachea and the adjacent flesh substantially back to the Atlas joint by overlapping shear action. The opposing wedge shaped separating portions readily engage in the joint. The first wedge portion 56 is the first to engage and enter the joint and separates it, while the second wedge portion 58 pries it apart. The bluntness of the first wedge portion 56 finds the joint rather than shears the bone so as to avoid bone chips. When the blades are fully closed, a small gap remains between the separating portions 52 and 54 to avoid blunting of the wedge portions. This structure and function of the separating portions 52 and 54 results in a reduction in bone chips in the product and less stress on the blades.

This invention has been described in its presently contemplated best modes, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A carcass head-separating tool comprising:
    first and second blades, said first and second blades being movable with respect to each other from an open position to a closed position;
    an actuator connected to said first and second blades to move said blades from said open position to said closed position;
    each of said blades having a shear portion and a separating portion, said shear portions of said first and second blades being separated in said open position and being overlapped in said closed position so that shearing action takes place therebetween as said blades move from said open position to said closed position, said separating portions of said blades being in a facing, substantially in contact, unoverlapped relationship when said blades are in the closed position so that the portion of the carcass between said shear portions is sheared and the portion of the carcass between said separating portions is separated when said blades move to said closed position.

2. The tool of claim 1 wherein each said shearing portion is substantially straight and said shearing portions of said blades have respective shear faces, and said shear faces lie substantially parallel to each other and in contact with each other when in said closed position.

3. The tool of claim 2 wherein said shearing portions of said blades ar wedge-shaped.

4. The tool of claim 1 wherein said shearing portions of said blades are wedge-shaped.

5. The tool of claim 4 wherein said wedge-shaped separating portions of said blades have a first wedge shape adjacent the separating edge of said blade and a second wedge shape behind said first wedge shape and away from the separating edge of said blades, said first wedge shape having a first included angle, said second wedge shape having a second included angle, said first included angle being larger than said second included angle.

6. The tool of claim 5 wherein said first included angle adjacent the edge of said separating portion of said blades is substantially a right angle to engage in vertebrae joints.

7. The tool of claim 6 wherein said second included angle of said second wedge shape is substantially 30 degrees for wedging apart vertebrae joints.

8. The tool of claim 6 wherein said shearing portions of said blades have the same angles as the corresponding said separating portions adjacent the edges of said separating portions.

9. The tool of claim 7 wherein said first and second blades are pivoted with respect to each other on a pivot pin and said actuator is connected to both said blades to rotate said first and second blades with respect to each other around said pivot pin.

10. The tool of claim 9 wherein said actuator has a piston rod and said piston rod is connected to rotate said first and second blades, said piston rod limiting the rotation of said blades toward the closed position to a point wherein said separating portions are spaced from each other.

11. The tool of claim 10 wherein said shearing portions of said blade are divergent from each other in the open position and are overlapped in the closed position.

12. A carcass head-separating tool comprising:
first and second blades, each of said blades having a pivot pin opening therethrough, a pivot pin engaged in said pivot pin opening so that said blades can be pivoted from an open position to a closed position;
an actuator connected to said blades to rotate said blades about said pivot pin with respect to each other from the open position to the closed position;
said blades each having a shearing portion and a separating portion, said shearing portion of said blades moving from a separated position in the blade-open position to an overlapped position in the blade-closed position so as to cause shearing of material therebetween when said blades move from the open position to the closed position;
said blades each having a separating portion, said separating portion being located closer to said pivot pin than said shearing portion, the blade edges of said separating portions being straight and lying substantially parallel to each other and closely spaced from each other in the blade-closed position so that, when moving from the blade-open position to the blade-closed position, said shear portion of said blades causes shearing of material therebetween and said separating portion of said blades causes separation of material therebetween.

13. The tool of claim 12 wherein said edges of said separating portion are wedge-shaped.

14. The tool of claim 13 wherein said wedge-shaped edges of said separating portions of said blades comprise a broad wedge shape adjacent said edge and a more acute wedge shape away from said edge.

15. The tool of claim 14 wherein said broad wedge-shaped edge of said separating portion is substantially a right angle.

16. The tool of claim 15 wherein said more acute wedge away from said edge of said separating portion has a total included angle of about 30 degrees.

17. The tool of claim 12 wherein said actuator limits motion of said blades toward each other to prevent contact of said separating portions of said blades.

18. The tool of claim 17 wherein said actuator has a piston rod and said piston rod limits rotation of said first and second blades toward the closed position.

19. The tool of claim 12 wherein said blades have tips and the distance between said pivot pin and said tips is such that said shearing portion of said blades shears the soft tissue of the carcass while said separating portion engages in a joint between bones to separate the bones by wedging therebetween at the joint.

20. The tool of claim 19 wherein said tool is sized to separate the Atlas joint in a beef carcass and said shear portions are sized to cut through to the trachea.

* * * * *